United States Patent
Minamihaba et al.

(10) Patent No.: US 7,166,017 B2
(45) Date of Patent: Jan. 23, 2007

(54) SLURRY FOR CMP, POLISHING METHOD AND METHOD OF MANUFACTURING SEMICONDUCTOR DEVICE

(75) Inventors: Gaku Minamihaba, Yokohama (JP); Yukiteru Matsui, Yokohama (JP); Hiroyuki Yano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/865,818

(22) Filed: Jun. 14, 2004

(65) Prior Publication Data

US 2005/0064796 A1    Mar. 24, 2005

(30) Foreign Application Priority Data

Sep. 18, 2003    (JP) .............................. 2003-326085

(51) Int. Cl.
*B24B 1/00*     (2006.01)
*B24B 7/19*     (2006.01)
*B24B 7/30*     (2006.01)
*B24C 1/00*     (2006.01)
*C23F 1/00*     (2006.01)
*H01L 21/306*   (2006.01)

(52) U.S. Cl. ............................. 451/36; 451/56; 451/60; 156/345.12

(58) Field of Classification Search .................. 451/36, 451/60, 56, 690–693; 156/345.11, 345.12, 156/345.21
See application file for complete search history.

(56) References Cited

U.S. PATENT DOCUMENTS

| | | | | |
|---|---|---|---|---|
| 4,243,784 A | * | 1/1981 | Akima et al. ................. | 526/88 |
| 5,876,490 A | * | 3/1999 | Ronay ............................. | 106/3 |
| 6,074,287 A | * | 6/2000 | Miyaji et al. ................ | 451/287 |
| 6,362,107 B1 | * | 3/2002 | Shiro et al. .................. | 438/692 |
| 6,375,545 B1 | * | 4/2002 | Yano et al. .................... | 451/36 |
| 6,454,819 B1 | | 9/2002 | Yano et al. | |
| 6,488,570 B1 | * | 12/2002 | James et al. ................... | 451/36 |
| 6,576,554 B2 | | 6/2003 | Matsui et al. | |
| 6,582,761 B1 | | 6/2003 | Nishimoto et al. | |
| 6,740,590 B1 | | 5/2004 | Yano et al. | |
| 2001/0016470 A1 | * | 8/2001 | Nobe ............................ | 451/41 |
| 2001/0036798 A1 | * | 11/2001 | Oliver .......................... | 451/41 |

FOREIGN PATENT DOCUMENTS

JP    11-176774    7/1999

OTHER PUBLICATIONS

Alger, Mark, Polymer Science Dictionary, 1997, Published by Chapman & Hall, Second Edition, p. 427.*

* cited by examiner

*Primary Examiner*—Joseph J. Hail, III
*Assistant Examiner*—Bryan R. Muller
(74) *Attorney, Agent, or Firm*—Oblon, Spivak, McClelland, Maier & Neustadt, P.C.

(57) ABSTRACT

There is disclosed a polishing method comprising contacting a polishing surface of a semiconductor substrate with a polishing pad comprising a resin as a main component and attached to a turntable, and dropping a CMP slurry onto the polishing pad to polish the polishing surface, the CMP slurry comprising a resin particle, an inorganic particle, a polymerizable component, and a polymerization initiator.

24 Claims, 2 Drawing Sheets

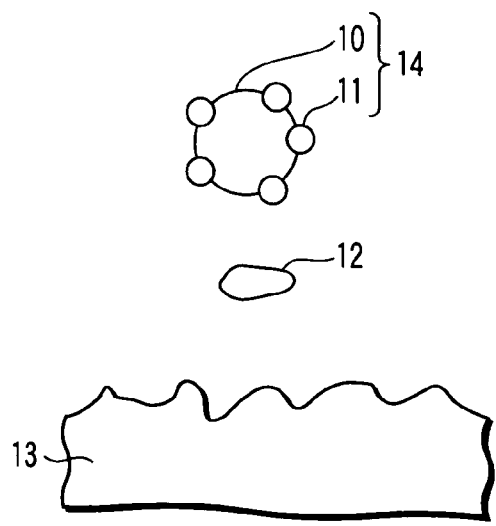
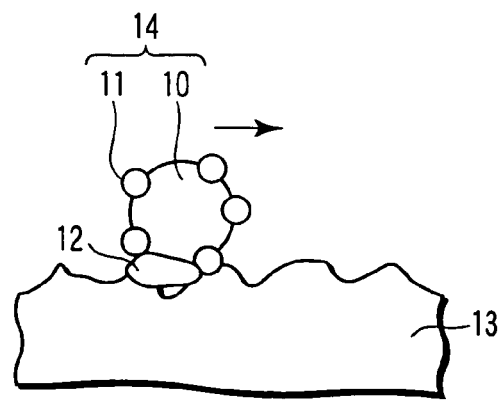
FIG. 1A    FIG. 1B
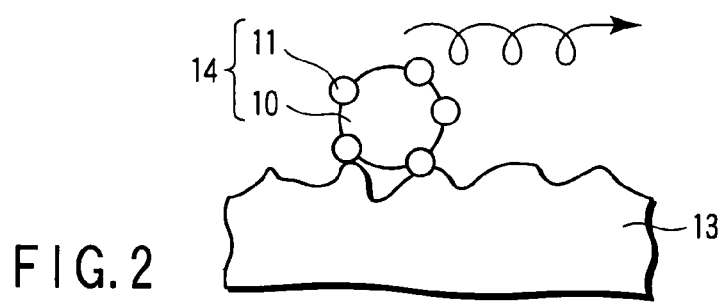
FIG. 2
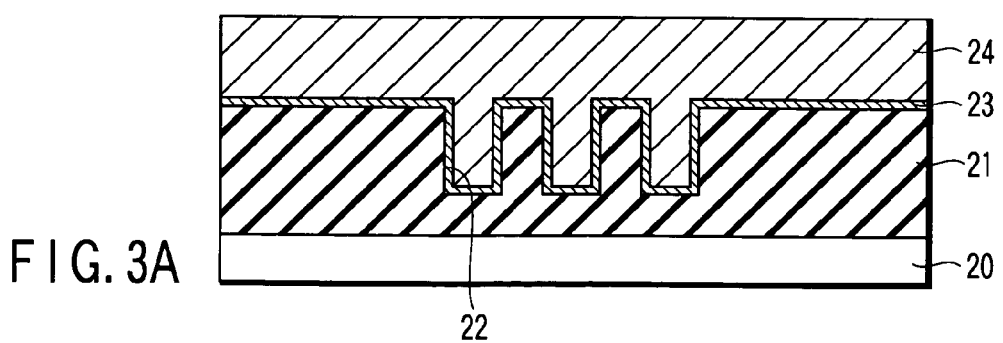
FIG. 3A
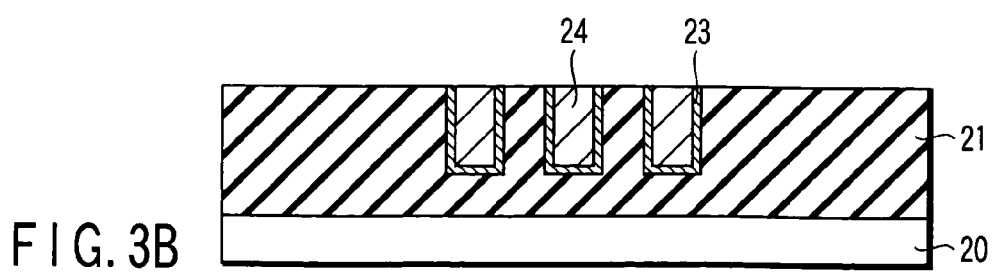
FIG. 3B

SLURRY FOR CMP, POLISHING METHOD AND METHOD OF MANUFACTURING SEMICONDUCTOR DEVICE

CROSS-REFERENCE TO RELATED APPLICATIONS

This application is based upon and claims the benefit of priority from the prior Japanese Patent Application No. 2003-326085, filed on Sep. 18, 2003; the entire contents of which are incorporated herein by reference.

BACKGROUND OF THE INVENTION

1. Field of the Invention

The present invention relates to a slurry to be used for CMP (Chemical Mechanical Polishing), a polishing method using the slurry, and a method of manufacturing a semiconductor device.

2. Description of the Related Art

It is expected that the integration of semiconductor elements in high performance LSIs of the next generation would be inevitably further enhanced. For example, the design rule of damascene wirings to be formed by CMP is expected to become so severe that the line width of wirings is confined within the range of 0.07 to 30 μm and the film thickness of wirings is confined to 100 nm or less.

When forming damascene wirings having a film thickness of 100 nm by the conventional CMP, abrasive grains which are detached from a polishing pad during polishing becomes free particles which are subsequently thrust into a surface to be polished (which may be referred hereinafter to "a polishing surface") to generate erosion having a depth of about 80 nm. In such a case, most of the wiring material (Cu, Al, W, etc.) buried inside a trench are undesirably removed from the trench. If the erosion becomes excessive, the electric resistance of the wirings would be increased, thereby degrading the performance of a semiconductor device. Additionally, there is also a possibility of generating the disconnection of wirings during the operation of large scale integrated circuits (LSI), thereby degrading the reliability of the semiconductor device. Therefore, it is required to control the size of the erosion to 20 nm or less.

It has been conventionally considered that the aforementioned requirement can be coped with by minimizing the generation of the free particles during the polishing, and hence, it has been conventionally proposed to employ a method to employ a fixed abrasive grain type CMP pad (for example, a fixed abrasive type CMP pad which is available from 3M Co., Ltd.) where the generation of free particles can be minimized. Although it may be possible to control the size of the erosion to not larger than 20 nm by using such a CMP pad, there are still left remained problems such as working efficiency, manufacturing cost, the quality of worked surface and the stability of products.

There is also proposed a method enhancing the interaction between abrasive grains and a polishing pad. For example, it is proposed to employ a slurry comprising composite particles as polishing grains, and an organic compound such as a surfactant or an organic acid. However, the employment of this slurry is impractical due to poor polishing efficiency thereof.

BRIEF SUMMARY OF THE INVENTION

A CMP slurry according to one aspect of the present invention comprises a resin particle, an inorganic particle, a polymerizable component, and a polymerization initiator.

A polishing method according to one aspect of the present invention comprises contacting a polishing surface of a semiconductor substrate with a polishing pad comprising a resin as a main component and attached to a turntable; and dropping a CMP slurry onto the polishing pad to polish the polishing surface, the CMP slurry comprising a resin particle, an inorganic particle, a polymerizable component, and a polymerization initiator.

A method of manufacturing a semiconductor device according to one aspect of the present invention comprises forming an insulating film above a semiconductor substrate; forming a recessed portion in the insulating film; depositing a conductive material inside the recessed portion as well as on the insulating film to form a conductive layer; and removing the conductive material which is deposited on the insulating film by CMP using a CMP slurry to expose a surface of the insulating film while selectively leaving the conductive material in the recessed portion, the CMP slurry comprising a resin particle, an inorganic particle, a polymerizable component, and a polymerization initiator.

BRIEF DESCRIPTION OF THE SEVERAL VIEWS OF THE DRAWING

FIGS. 1A and 1B show respectively a schematic view illustrating the general concepts of one embodiment of the present invention;

FIG. 2 is a schematic view illustrating a state of conventional composite type particle as it is placed on a polishing pad;

FIGS. 3A and 3B are cross-sectional views each illustrating, in stepwise, the method of manufacturing a semiconductor device according to one embodiment of the present invention;

DETAILED DESCRIPTION OF THE INVENTION

Figure 4:
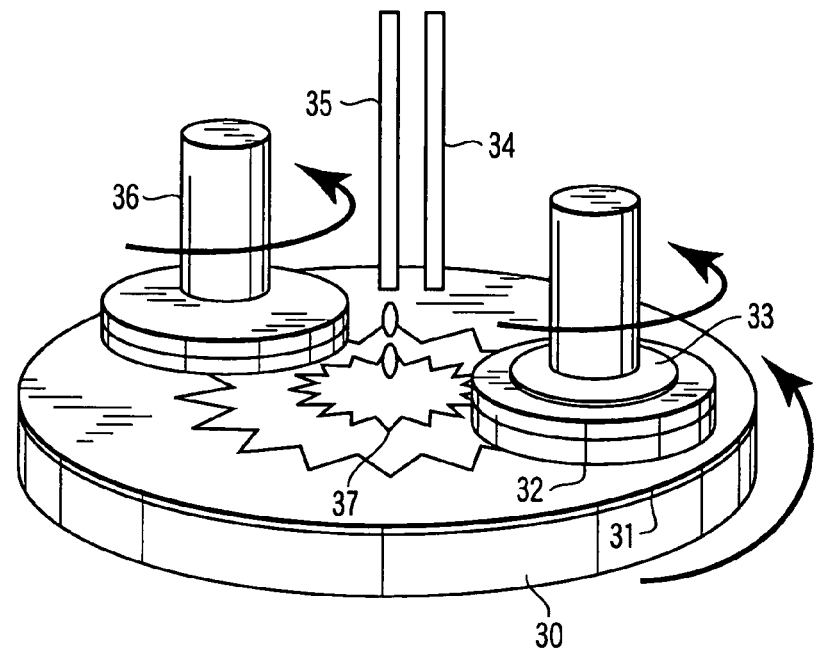
FIG. 4 is a perspective view schematically illustrating a state of CMP.

Next, the embodiments of the present invention will be explained with reference to drawings.

If the polishing of a treating substrate is to be performed while suppressing the generation of erosion, it is effective to minimize the generation of free particles. Incidentally, by the term "erosion", it is intended to represent a total of dishing and thinning. It has been found out by the present inventors that the fixing of polishing particle to a polishing pad and minimizing the generation of free particles can be realized by incorporating a polymerizable component and a polymerization initiator into a slurry containing a resin particle and an inorganic particle, and by polymerizing the polymerizable component.

Next, the general concepts, in accordance with one embodiment of the present invention, will be explained with reference to FIGS. 1A and 1B.

FIG. 1A illustrates a state of a slurry containing a resin particle 10, an inorganic particle 11, a polymerizable component 12 and a polymerization initiator (not shown) at the moment immediately after the feeding of the slurry to a polishing pad 13. In FIG. 1A, the inorganic particle 11 is linked to the surface of the resin particle 10 to form a composite type particle 14. However, the present invention is not limited to such a composite type particle. Incidentally, by the term "composite type particle 14", it is intended to represent a state of resin particle wherein the surface of the resin particle is covered by substantially monolayer of inorganic particles with these inorganic particles existing separately from each other without being flocculated with each other. Therefore, a state wherein a plurality of resin particles and a plurality of inorganic particles are adsorbed to each other to form a bulk body should not be considered inclusive within the definition of the composite type particle as defined above.

As shown in FIG. 1B, the composite type particle 14 is fixed to the polishing pad 13 during the process of CMP. Namely, the polymerizable component 12 polymerizes due to the effect of the polymerization initiator, thereby enabling the resin particle 10 to chemically bond to the polishing pad 13 while concurrently entrapping therein the inorganic particle 11.

FIG. 2 illustrates a state of composite type particle of the conventional slurry as the particle is placed on the polishing pad. Since a polymerizable component and a polymerization initiator are not incorporated in the slurry, there is no possibility that the composite type particle 14 can be fixed to the polishing pad 13. Therefore, the composite type particle 14 containing the inorganic particle 11 easily roll over the polishing pad 13, thus becoming the composite type particle 14 to a free particle.

According to the embodiment of the present invention, the inorganic particle acting as an abrasive grain is enabled to fix to a polishing pad, thereby making it possible to perform the polishing of a treating substrate under the conditions where the generation of free particle is sufficiently suppressed. As a result, it is now possible to minimize the generation of erosion, thus making it possible to polish a polishing surface of substrate at a practically acceptable polishing rate.

Next, details of each of various components to be included in a slurry according to the embodiment of the present invention will be explained as follows.

Since it is possible, according to the embodiment of the present invention, to further enhance the effect of fixing an inorganic particle to a polishing pad, the resin particle 10 and an inorganic particle 11 in the slurry of one embodiment of the present invention should preferably be combined with each other to form the composite type particle 14.

As for the composite type particle 14, it is possible to employ those described in JP Laid-open Patent Publication (Kokai) No. 2000-204352. Generally, the composite type particle 14 can be synthesized according to the following procedures. First of all, a silane coupling agent is linked to divinylbenzene polymer particle employed as a resin component for constituting a resin particle 10, and then, the resultant particle is allowed to react with a specific silane alkoxide or colloid silica. It is possible in this manner to fix to the surface of the resin particle 10 a silicon compound moiety formed, for example, of a polysiloxane structure for constituting the inorganic particle 11. Alternatively, the silicon compound moiety can be formed without necessitating the employment of a silane coupling agent. The inorganic particle should preferably be bonded, directly or via a silane coupling agent, to the resin particle. Furthermore, the composite type particle 14 of the similar structure as described above can be obtained by using a compound such as aluminum, titanium or zirconium.

Next, the resin particle 10 of the composite type particle 14 will be explained in detail as follows.

Namely, the resin particle 10 is a particle formed of a polymer that can be obtained through the polymerization of various monomers. As for the monomers, it is possible to employ unsaturated aromatic compounds such as styrene, α-methyl styrene, styrene halide and divinylbenzene; unsaturated esters such as vinyl acetate and vinyl propionate; and unsaturated nitriles such as acrylonitrile. It is also possible to employ acrylic esters or methacrylic esters such as methyl acrylate, methyl methacrylate, ethyl acrylate, ethyl methacrylate, 2-ethylhexyl acrylate, 2-ethylhexyl methacrylate, lauryl acrylate, lauryl methacrylate, ethylene glycol diacrylate, ethylene glycol dimethacrylate, glycidyl acrylate, glycidyl methacrylate, 2-hydroxy ethylacrylate, acrylacrylate and acrylmethacrylate.

It is also possible to employ, as the monomer, butadiene, isoprene, acrylic acid, methacrylic acid, acrylamide, methacrylamide, N-methyrol acrylamide and N-methyrol methacrylamide. These monomers can be employed singly or in combination of two or more.

The resin particle can be obtained through the polymerization of these monomers using various methods including emulsion polymerization, suspension polymerization and dispersion polymerization. It is possible, through suitable controlling of polymerization conditions, to optionally adjust the particle diameter of the resin particle. Further, it is also possible to obtain resin particle of desired particle size through the pulverization of bulky resin particle. In particular, if it is desired to obtain resin particle which are excellent in mechanical strength and in heat resistance, a polyfunctional monomer may be co-used in the manufacture of the resin particle to introduce a crosslinked structure into the molecule of resin particle. The crosslinked structure may be introduced into the molecule of resin particle by chemical crosslinking or electron radiation crosslinking during or after the manufacture of resin particle.

Although there is not any particular limitation with respect to the configuration of resin particle, the configuration of resin particle should preferably be as spherical as possible. As for the average particle diameter of the resin particle when it is assumed as being spherical, it is preferable to confine it to the range of 10 to 500 nm. If this average particle diameter is less than 10 nm, it would become difficult to secure a sufficient polishing performance due to an insufficient particle size of the resin particle. On the other hand, if this average particle diameter exceeds 500 nm, the dispersibility of the composite type particle would be degraded, thereby greatly degrading the storage stability of the composite type particle. The average particle diameter of the resin particle should more preferably be confined within the range of 30 to 200 nm, most preferably within the range of 50 to 150 nm.

It is preferable to introduce a functional group such as hydroxyl group, epoxy group, carboxyl group, etc., into the resin particle obtained in this manner. In this case, an inorganic particle can be directly linked to the resin particle without necessitating the intervention of a coupling compound such as a silane coupling agent, etc. When a silane coupling agent having a functional group which is capable of reacting with a functional group that has been introduced into the resin particle is co-used, the linkage between the inorganic particle and the resin particle would be further promoted, thus making it possible to obtain a composite type particle which is capable of exhibiting more excellent performance.

As for the resin particle, it is possible to employ particles consisting of various polymers such as polyamide, polyester, polycarbonate, polyolefin, etc. In the same manner as described above, even in the case of these resin particles, functional groups as described above can be introduced into the resin particle and at the same time, a crosslinked structure can be also introduced into the resin particle.

As described above, although it is possible to employ various polymers, the employment of polymethylmethacrylate (PMMA) and polystyrene (PST) is especially preferable as these compounds are easily available in the industries concerned.

Next, the silicon compound moiety and the metal compound moiety, both constituting the inorganic particle 11, will be explained in detail as follows. In this composite type particle 14, the inorganic particle 11 is at least partially linked directly or indirectly to the resin particle 10. However, the inorganic particle should preferably be linked chemically to the resin particle in order to obviate the generation of the problem that the inorganic particle 11 is easily detached from the resin particle 10 during the polishing step and remains on the polishing surface of substrate. As for the chemical linkage, it may be of any kind including ionic bond and coordinate bond, but preferably be covalent bond in view of achieving a stronger bond between the inorganic particle 11 and the resin particle 10. Alternatively, the inorganic particle 11 may be linked to the resin particle 11 through a non-chemical bonding such as hydrogen bond, surface charge bond, interlocking bond and anchor effect bond.

In order to enable the inorganic particle 11 to bond onto the surface of the resin particle 10, the inorganic particle 11 is required to be smaller in particle size than that of the resin particle 10. It has been determined through calculation that as long as the longest diameter of the inorganic particle 11 is confined to not larger than about ⅕ of the particle diameter of the resin particle 10, the inorganic particle 11 is possible to link uniformly to the surface of the resin particle 10. However, in order to secure desirable polishing power of the inorganic particle 11, the longest diameter of the inorganic particle 11 should preferably be 5 nm or more.

The silicon compound moiety constituting the inorganic particle may be constituted by at least either one of the siloxane bond-containing portion and the silica particle portion. Further, the metal compound moiety can be constituted by at least one portion selected from the group consisting of metalloxane bond-containing portion, alumina particle portion, titania particle portion and zirconia particle portion.

These inorganic particles should preferably be adsorbed as a monolayer onto the surface of the resin particle so as to cover the entire surface of the resin particle. When the inorganic particle is deposited on the surface of the resin particle in this manner, it is possible to prevent the generation of bulk body or coarse particle of inorganic particle, thereby making it possible to greatly minimize the generation of scratches on the occasion of polishing a treating substrate. Furthermore, it is also advantageous in the respect that the elasticity of the resin can be more easily effected.

The inorganic particle may be linked directly or via a coupling compound such as a silane coupling agent to the resin particle. As for the coupling compound, it is possible to employ a silane coupling agent, an aluminum-based coupling agent, a titanium-based coupling agent and a zirconium-based coupling agent. Among them, the silane coupling agent is most preferable. As for the silane coupling agent, they include the following groups of compounds (a), (b) and (c).

(a) Vinyl trichlorsilane, vinyl tris(β-methoxyethoxy) silane, vinyl triethoxy silane, vinyl trimethoxy silane, γ-methacryloxy propyltrimethoxy silane, γ-mercaptopropyl trimethoxy silane, and γ-chloropropyl trimethoxy silane.

(b) γ-glycidoxypropyl trimethoxy silane, and γ-glycidoxypropyl methyldiethoxy silane.

(c) N-β(aminoethyl) γ-aminopropyltrimethoxy silane, N-β(aminoethyl) γ-aminopropylmethyl dimethoxy silane, and γ-aminopropyl triethoxy silane.

As for the silane coupling agent, it is preferable to employ those having a functional group which is capable of easily reacting with the functional group that will be introduced into the resin particle. For example, in the case of the resin particle having carboxyl group introduced into the surface thereof, it is preferable to employ silane coupling agents of the aforementioned groups (b) and (c) having epoxy group or amino group. Among them, γ-glycidoxypropyl trimethoxy silane and N-β(aminoethyl) γ-aminopropyltrimethoxy silane are most preferable.

As for the aluminum-based coupling agent, they include acetalkoxy aluminium diisopropylate, etc. As for the titanium-based coupling agent, they include isopropyl triisostearoyl titanate, isopropyl tridecylbenzene sulfonyl titanate, etc. These various coupling agents may be used singly or in combination of two or more. Further, it is also possible to employ different coupling agents than those mentioned above.

The mixing ratio of the coupling agents should preferably be confined to 0.1 to 50 moles per mole of functional group to be introduced into the resin particle. More preferably, this mixing ratio should be confined to 0.5 to 30 moles, most preferably 1.0 to 20 moles per mole of the functional group. If the mixing ratio of the coupling agents is less than 0.1 mole, it would be impossible to bond sufficiently strongly the inorganic particle to the resin particle, thereby falling the inorganic particle from the resin particle during the polishing. On the other hand, if the mixing ratio of the coupling agents exceeds 50 moles, the condensation reaction of the molecules of coupling agent would be proceed, thus giving rise to the generation of undesirable polymers. In that case, the linkage of the inorganic particle to the resin particle would be obstructed.

On the occasion of chemically bonding a coupling agent to the resin particle, the chemical reaction can be promoted by using a catalyst such as acids or bases. Further, the chemical reaction can be also promoted by increasing the temperature of reaction system.

The compounds represented by the following general formula (1) can be employed as a raw material for the inorganic particle.

$$R_nM(OR')_{z-n} \quad (1)$$

In this formula (1), R, R', M, z and n are defined as follows.

Namely, R is a monovalent organic group having 1 to 8 carbon atoms such as alkyl group including methyl, ethyl, n-propyl, iso-propyl, n-butyl, sec-butyl, tert-butyl and n-pentyl, phenyl group, vinyl group and glycidopropyl group; and R' is alkyl group having 1 to 5 carbon atoms, acyl group having 2 to 6 carbon atoms, or aryl group having 6 to 9 carbon atoms, specific examples thereof including methyl, ethyl, n-propyl, iso-propyl, acetyl group, propionyl group, butyryl group, valeryl group, caproyl group, phenyl group, and tolyl group.

If the number of each of R and R' is 2 or more, each of Rs and R's may be the same with or different from each other in kind.

M is selected from the group consisting of Al, Si, Ti, V, Cr, Mn, Fe, Co, Ni, Cu, Zn, Ge, Zr, Nb, Mo, Sn, Sb, Ta, W, Pb and Ce. Among them, Al, Si, Ti and Zr are preferable.

z is the valence number of M; and n is an integer ranging from 0 to (z−1).

Next, the compounds containing Al, Si, Ti or Zr as the aforementioned M will be further explained. As for the compounds where Si is included as this M, they include tetramethoxy silane, tetraethoxy silane (TEOS), tetra-iso-propoxy silane, tetra-tert-butoxy silane, methyltrimethoxy silane and methyltriethoxy silane. By the employment of these compounds, the inorganic particle formed of a silicon compound moiety can be obtained. Further, aluminum ethoxide, etc. where Al is included as this M; titanium(IV) ethoxide, etc., where Ti is included as this M; and zirconium-tert-butoxide, etc. where Zr is included as this M may be employed. By using these compounds, metalloxane bond-containing portion, alumina particle portion, titania particle portion and zirconia particle portion, each representing the inorganic particle, can be formed.

The aforementioned compounds may be employed singly or in combination of two or more. Further, compounds where the aforementioned M is constituted by Al, Si, Ti or Zr can be co-used. The compounds represented by the aforementioned general formula (1) where (z−n) is 2 or more are more preferable since they are capable of forming siloxane bond-containing portion or metalloxane bond-containing portion, both of which are more excellent in denseness.

In addition to the compounds represented by the aforementioned general formula (1), it is also possible to employ at least either one of the hydrolyzates and partial condensates thereof. The compounds represented by the aforementioned general formula (1) are capable of undergoing hydrolysis or partial condensation without necessitating any special procedure. However, if required, a predetermined ratio of the compounds may be subjected in advance to hydrolysis or partial condensation.

The mixing ratio of these compounds (calculated as $SiO_2$, $Al_2O_3$, $TiO_2$ or $ZrO_2$) should preferably be confined to the range of 0.001 to 100, more preferably 0.005 to 50, most preferably 0.01 to 10 based on the weight of the resin particle. If this weight ratio is less than 0.001, it would become impossible to sufficiently create the inorganic particle in the inside as well as on the surface of the resin particle, thereby degrading the polishing performance of CMP slurry. On the other hand, even if this weight ratio is increased over 100, it would be difficult to expect a remarkable enhancement of the polishing performance.

Further, at least one inorganic material selected from the group consisting of colloidal silica, colloidal alumina, colloidal titania and colloidal zirconium may be employed as a raw material for the inorganic particle. These colloidal components can be prepared by dispersing silica, alumina, titania or zirconia fine particles having an average particle diameter ranging from 5 to 500 nm in a dispersion medium such as water. These fine particles can be prepared by a method where particles grow in an alkali aqueous solution or by a vapor-phase method.

These fine particles may be bonded via the aforementioned siloxane bond-containing portion or metalloxane bond-containing portion to the resin particle. Alternatively, by using a hydroxyl group that has been introduced into these fine particles, these fine particles can be bonded to the resin particle, siloxane bond-containing portion or metalloxane bond-containing portion, thus constructing each of particle portions.

The mixing ratio of these colloids (calculated as $SiO_2$, $Al_2O_3$, $TiO_2$ or $ZrO_2$) should preferably be confined to the range of 0.001 to 100, more preferably 0.01 to 50, most preferably 0.1 to 10 based on the weight of the resin particle. If this weight ratio is less than 0.001, it would become impossible to sufficiently form the inorganic particle. On the other hand, even if this weight ratio is increased over 100, it would be impossible to expect any further enhancement of the polishing performance.

In the process of causing the aforementioned components to react with the resin particle, the process can be performed in a dispersion system where water or various organic solvent such as alcohol are employed as a dispersion medium. These dispersion mediums may be employed singly or in combination of two or more. When a dispersion medium containing water is employed, it is preferable to introduce in advance a hydrophilic functional group such as hydroxyl group, epoxy group and carboxylic group into the resin particle, thereby enabling the resin particle to stably and uniformly disperse in the dispersion system. It becomes possible, through the introduction of these functional groups, to enable the aforementioned inorganic particle to more easily bond to the resin particle.

As for the alcohols that can be employed as a dispersion medium, they include lower saturated aliphatic alcohols such as methanol, ethanol, 1-propanol, 2-propanol, 1-butanol, 2-butanol, tert-butanol, etc. These alcohols may be employed singly or in combination of two or more. As for the organic solvents other than alcohols, they include for example methylethyl ketone and dimethyl formamide. These organic solvents, water and alcohols can be used as a mixture by mixing them at a predetermined ratio.

On the occasion of effecting the reaction between the inorganic component and the resin particle, the content of the resin particle in the dispersion medium should preferably be confined within the range of 1 to 30% by weight, more preferably 5 to 20% by weight, most preferably 10 to 15% by weight. If the content of the resin particle is less than 1% by weight, it would become difficult to obtain composite type particles at a sufficient yield. On the other hand, if the content of the resin particle exceeds 30% by weight, the dispersion stability of the resin particle would be degraded, thus raising the problem that gel is liable to generate in forming the composite.

The reaction to bond the inorganic particle to the resin particle can be promoted by heating or by the addition of a catalyst. If the reaction is to be promoted by heating, the temperature of the reaction system should preferably be confined within the range of 40 to 100° C. As for the catalysts to be employed in this case, it is possible to employ acids, bases, aluminum compounds and tin compounds. Among them, the employment of acid catalysts and aluminum catalysts is more preferable in view of their prominent reaction-promoting effects. In order to obtain a composite particle having, on the surface thereof, the inorganic particle bonded thereto as a monolayer, the reaction should preferably be performed under the condition where individual inorganic particle is uniformly dispersed.

Further, it is also possible to employ composite type particles which can be produced through the heat adhesion to be effected by a mechanofusion phenomenon. These composite type particles are described, for example, in U.S. Pat. No. 6,576,554 B2 (the disclosures of which are incorporated herein by reference).

Although it is possible to employ various composite type particles as described above, it is also possible to incorporate the resin particle and the inorganic particle as a separate component instead of using them as a composite particle in the preparation of the slurry according to one embodiment of the present invention. As for the inorganic particle to be employed in this case, it includes ceria in addition to the aforementioned silica, alumina, titania and zirconia. These inorganic particles may be employed as a mixture of two or more. It is preferable that the inorganic particle is substantially completely spherical and monodispersible. Further, in view of generally admitted usefulness as an abrasive grain as well as in terms of cost, the employment of colloidal particle is preferable as the inorganic particle. However, it is also possible to employ, as the inorganic particle, fumed particle for obtaining almost the same effects as described above.

If the resin particle and the inorganic particle are not employed in the form of composite particle, the resin particle may be provided, on the surface thereof, with a functional group such as amino group or carboxylic group. Depending on the combination of the functional group on the surface of the resin particle and the inorganic particle, the resin particle and the inorganic particle adsorb to each other or to repel each other. If there is no functional group on the surface of the resin particle, the resin particle and the inorganic particle exist without the generation of adsorption or repulsion. If two particles adsorb to each other, a plurality of the resin particles and a plurality of the inorganic particles flocculate to form a bulky body.

Irrespective of whether or not the resin particle and inorganic particle are formed into a composite structure, the content of the resin particle in the slurry according to one embodiment of the present invention should preferable be confined within the range of 0.01 to 20% by weight, more preferably 0.1 to 10% by weight. If the content of the resin particle is less than 0.01% by weight, it may become difficult to achieve a practically acceptable polishing rate. On the other hand, if the content of the resin particle is larger than 20% by weight, the stability of the resin particle in the slurry would be degraded, thereby giving rise to the generation of a solid matter or the increase in viscosity of the slurry.

Irrespective of whether or not the inorganic particle is formed, together with the resin particle, into a composite structure, the content of the inorganic particle in the slurry according to one embodiment of the present invention should preferable be confined within the range of 0.01 to 20% by weight, more preferably 0.1 to 10% by weight. If the content of the inorganic particle is less than 0.01% by weight, it may become difficult to achieve a practically acceptable polishing rate. On the other hand, if the content of the inorganic particle is larger than 20% by weight, the dispersibility of the inorganic particle in the slurry would be degraded.

The polymerizable component should preferably be constituted by the same kinds of organic materials as those to be employed for the resin particle in order to enhance the interaction of the polymerizable component to the resin particle. This polymerizable component should preferably be constituted by a monomer.

For example, when the resin particle is formed of polymethylmethacrylate (PMMA), the polymerizable component should preferably be constituted by methylmethacrylate. In this case, if the polishing pad to be employed is formed of PMMA, the interaction among these components would be preferably enhanced. Likewise, when the resin particle is formed of polystyrene, the polymerizable component should preferably be constituted by styrene and the polishing pad should preferably be constituted by polystyrene.

As for the polymerizable component to be used herein, it is also possible in this case to employ a monomer such as ethylene, vinyl chloride, and butadiene.

As long as the aforementioned polymerizable components are included in the slurry at a concentration ranging from 0.01 to 20% by weight, the effects of the polymerizable components can be secured. If the polymerizable components are excessively included in the slurry exceeding 20% by weight, the dispersibility thereof would be degraded, thus increasing the viscosity of the slurry. More preferably, the concentration of the polymerizable components should be confined within the range of 0.05 to 10% by weight.

Incidentally, even if all of the resin particle, the polymerizable component and the polishing pad are constituted by different organic materials, the effects of the polymerizable component to enable the inorganic particle acting as an abrasive grain to fix to the polishing pad can be secured. For example, even if the resin particle is formed of PMMA, the polymerizable component is formed of styrene, and the polishing pad is formed of polypropylene or polyurethane, the inorganic particle can be fixed to the polishing pad.

As for the polymerization initiator, it is possible to employ azo compounds such as ACVA (4,4'-azobis-4-cyanovaleric acid), peroxides such as benzoyl peroxide and persulfate, etc. The mixing ratio of the polymerization initiator may vary depending on the polymerization degree desired to achieve. Generally speaking however, the polymerization initiator may be incorporated at a ratio of 1/100 to 10 times as much as the weight of the polymerizable component. These polymerization initiators may be used singly or in combination of two or more.

The polymerization of the polymerizable component may be performed by the irradiation of light or radiation or by the employment of a catalyst. Further, in order to control the polymerization degree, it is possible to employ a crosslinking agent, a chain-transfer agent, etc. There is a danger of generating ignition or explosion due to the generation of heat as the polymerization of the polymerizable component is proceeded or due to an extraordinary reaction as the polymerization is accelerated. If such a polymerizable component is to be employed, it is conceivable to co-use a polymerization inhibitor.

The slurry according to one embodiment of the present invention can be prepared by dispersing a resin particle, an inorganic particle, a polymerizable component and a polymerization initiator in a dispersing agent. As for the dispersing agent, it is possible to employ water such as pure water, ion-exchange water, alcohols, etc.

If required, the slurry according to the embodiment of the present invention may contain various additives such as an oxidizing agent, an oxidation inhibitor, a surfactant (emulsifying agent), a pH-adjusting agent, etc.

Since the slurry according to one embodiment of the present invention includes a polymerizable component and a polymerization initiator in addition to the resin particle and the inorganic particle, it is possible to enable the polymerization reaction of the polymerizable component to take place on the polishing pad during polishing. On this occasion, the polymerizable component is enabled to couple with the resin particle while entrapping the inorganic particle therein, thereby fixing the inorganic particle to the surface of the polishing pad. As a result, the generation of free particles can be minimized, thereby making it possible to perform the polishing at a high polishing rate while suppressing the generation of erosion.

By using the slurry as described above, it is possible to solve all of the problems accompanied with the conventional fixed abrasive grain type pad such as working efficiency, cost, the quality of worked surface, and stability.

Embodiment 1

A sample of slurry was prepared by following the procedures described below.

First of all, 94 parts (hereinafter, "part(s)" means "part(s) by weight") of methylmethacrylate, 1 part of methacrylic acid, 5 parts of hydroxymethylmethacrylate, 0.03 parts of ammonium lauryl sulfate, 0.6 parts of ammonium persulfate and 400 parts of ion-exchange water were placed in a 2 L flask. The resultant mixture was allowed to polymerize for 6 hours with stirring in a nitrogen gas atmosphere and at a temperature of 70° C. As a result, a PMMA particle having a primary particle diameter of 120 nm and amino group on the surface thereof was obtained.

Then, colloidal silica particle (15 nm in primary particle diameter) as an inorganic particle was allowed to adsorb onto the surface of the PMMA particle to prepare a composite type particle. On the occasion of preparing the composite particle, the PMMA particle was dispersed together with the silica particle in water and the resultant dispersion was subjected to a shearing process using marine propeller stirrer, thereby adsorbing the silica particle onto the surface of the PMMA particle. Then, the resultant dispersion was diluted to 10-fold and coated over a sample table and dried. When this dried layer was observed by SEM, the average particle diameter of this composite type particle was 150 nm and the surface of the PMMA particle was covered and adsorbed by substantially the monolayer of colloidal silica particle, thus constituting the composite type particle.

5% by weight of the composite type particle thus obtained, 5% by weight of methyl polymethacrylate (molecular weight: about 300) as a polymerizable component, and 1% by weight of benzoyl peroxide as a polymerization initiator were added to pure water employed as a solvent to prepare a slurry of Sample 1.

This Sample 1 contained 2.5% by weight of the PMMA particle as a resin particle, and 2.5% by weight of the colloidal silica particle as an inorganic particle.

Additionally, the slurries of Samples 2 to 4 were prepared by following the same procedures as described above except that the composite type particle was changed to a mixture of the PMMA particle and silica particle. As for the silica particle, the same colloidal silica having a primary particle diameter of 15 nm as that of Sample 1 was employed. On the other hand, the functional group on the surface of PMMA particle (15 nm in primary particle diameter) as well as the mixing condition of the PMMA particle were controlled so as to prevent the formation of a composite type particle that may be caused through the combination thereof with the inorganic particle. The PMMA particle and the silica particle were both added to pure water at a concentration of 2.5% by weight.

The PMMA particles employed in Samples 2, 3 and 4 were a PMMA particle having carboxyl group on the surfaces thereof, a PMMA particle having amino group on the surfaces thereof, and a PMMA particle having no functional group on the surfaces thereof, respectively. In the case of the slurry of Sample 2, due to the carboxyl group on the surface of the PMMA particle, the silica particle and the PMMA particle repelled each other. In the case of the slurry of Sample 3, due to the amino group on the surface of the PMMA particle, a group of the silica particle and a group of the PMMA particle adsorbed to each other, thereby generating an integrated bulky body. Further, in the case of the slurry of Sample 4, due to the absence of these groups on the surface of the PMMA particle, there was recognized neither repulsion nor adsorption between the silica particle and the PMMA particle.

Additionally, as a comparative example 1, a slurry of Sample 5 was prepared by following the same procedures as those of Sample 1 except that a polymerization initiator was not employed. Incidentally, since Samples 1 to 4 contained not only a polymerizable component but also a polymerization initiator, these slurries were ones representing one embodiment of the present invention.

By using these slurries thus obtained, AlCu 0.5 at %-CMP was performed according to the following procedures and the polishing rate of AlCu 0.5 at % was investigated.

FIGS. 3A and 3B are cross-sectional views each illustrating the steps of AlCu 0.5 at %-CMP.

First of all, as shown in FIG. 3A, an insulating film 21 having a film thickness of 300 nm was deposited on a semiconductor substrate 20, and wiring trenches 22 (0.07–30 µm in width and 150 µm in depth) were formed. Further, a wiring material film 24 having a thickness of 180 nm was formed, via a barrier metal film 23 having a thickness of 10 nm, the entire surface of the semiconductor substrate 20. As for the barrier metal film 23, a TiN film was employed, and as for the wiring material film 24, an AlCu 0.5 at % was employed.

The redundant portions of the TiN film and the AlCu 0.5 at % film were removed by CMP to expose the surface of the insulating film 21 as shown in FIG. 3B.

The polishing of the AlCu 0.5 at % film 24 and the TiN film 23 was performed as follows by using a polishing pad having a PMMA as a matrix and the aforementioned slurries. Namely, as shown in FIG. 4, while rotating a turntable 30 having a polishing pad 31 attached thereto at a speed of 100 rpm, a top ring 33 holding a semiconductor substrate 32 was allowed to contact with the turntable 30 at a polishing load of 300 gf/cm$^2$. The rotational speed of the top ring 33 was set to 102 rpm, and slurry 37 was fed onto the polishing pad 31 from a slurry supply nozzle 35 at a flow rate of 200 cc/min. Incidentally, FIG. 4 also shows a water supply nozzle 34 and a dresser 36.

Since the conditioning of the polishing pad 31 can be performed by the dresser 36, it is possible not only to obtain such a fresh surface of the polishing pad 31 that will be required for the polymerization but also to suitably remove the inorganic particle that has been fixed to the surface of the polishing pad 31.

When the slurry of Sample 5 was employed, the polishing rates of the AlCu 0.5 at % film and the TiN film were both 20 nm/min or less, thus failing to polish these films at a practically acceptable polishing rate. Whereas, the slurries of Samples 1–4 were employed, the polishing rates of the AlCu 0.5 at % film and the TiN film were about 90 nm/min and about 30 nm/min, respectively, thus demonstrating improvements of polishing rate. Further, the erosion was confined to 15 nm or less, and the number of scratches on the surfaces of the AlCu 0.5 at % and the insulating film 21 was 2/cm$^2$. As long as the erosion can be suppressed to not more than 20 nm and the number of scratches can be suppressed to not more than 5/cm$^2$, the product may be considered acceptable as they would not substantially have any bad influence on the performance of semiconductor devices.

The inorganic particle and the resin particle in the slurry were integrated in the cases of Samples 1 and 3. However, in Sample 2, the inorganic particle and the resin particle repelled each other, and in Sample 4, the inorganic particle and the resin particle were not adsorbed to each other. Even if the inorganic particle and the resin particle are not necessarily integrated with each other, it is possible to perform the polishing at a high polishing rate while suppressing the generation of erosion and scratches. The reason for this can be assumedly attributed to the fact that the polymerizable component polymerizes during the process of polishing, thereby enabling it to entrap the inorganic particle together with the resin particle and enabling the inorganic particle to act on the polishing pad.

For the purpose of comparison, samples were prepared by following the same procedures as those of Samples 2–4 except that the polymerizable component was not employed. Then, by using these samples, the CMP was performed in the same manner as described above. As a result, even though it was possible to polish the AlCu 0.5 at % film at almost the same polishing rate as that of Samples 2–4, erosion of 60 nm or more generated. The reason for this can be assumedly attributed to the fact that a polymerizable component is not included in the slurries, it was impossible to sufficiently fix the inorganic particle to the surface of the polishing pad, thus failing to sufficiently suppress the generation of free particles.

The surface of the polishing pad that had been employed for the polishing using the slurry of Sample 4 was washed with pure water and then observed by SEM. Incidentally, this washing was performed by feeding pure water onto the polishing pad from a water supply pipe. As a result, it was possible to confirm that the inorganic particle was kept fixed to the surface of the polishing pad. Although the surface of the polishing pad employed in this case was found having a roughness of about Ra 3 µm before CMP, the roughness thereof after CMP was diminished to about Ra 1 µm and the inorganic particle was placed on the projected portions of the polishing pad. When the CMP was tried in the same manner as described above except that the slurry was not fed thereto, it was found possible to perform the polishing at almost the same polishing rate as described above. Since the inorganic particle was not eliminated from the surface of the polishing pad even if the polishing pad was subjected to washing treatment and since it was possible to perform the polishing without the supply of slurry, it was determined that the inorganic particle was fixed to the surface of the polishing pad through the polymerization of the polymerizable component.

Further, the surface of the polishing pad that had been employed for the polishing using the slurry of Sample 5 was also washed with pure water in the same manner as described above and then observed by SEM. In this case however, the existence of the inorganic particle was hardly recognized on the surface of the polishing pad after the washing with pure water.

The phenomenon of the fixing of inorganic particle can be promoted by raising the temperature of the polishing surface to about 60° C. due to the stress of CMP. Namely, in this case, since the polymerization reaction of the polymerizable component can be accelerated and the resin particle strongly bonds to the polishing pad, the inorganic particle can be strongly fixed to the surface of the polishing pad.

Incidentally, when the inorganic particle is effectively fixed to a polishing pad by suitably selecting the top ring for holding a semiconductor substrate, the effects of the slurry according to one embodiment of the present invention would be further enhanced.

Figure 5:
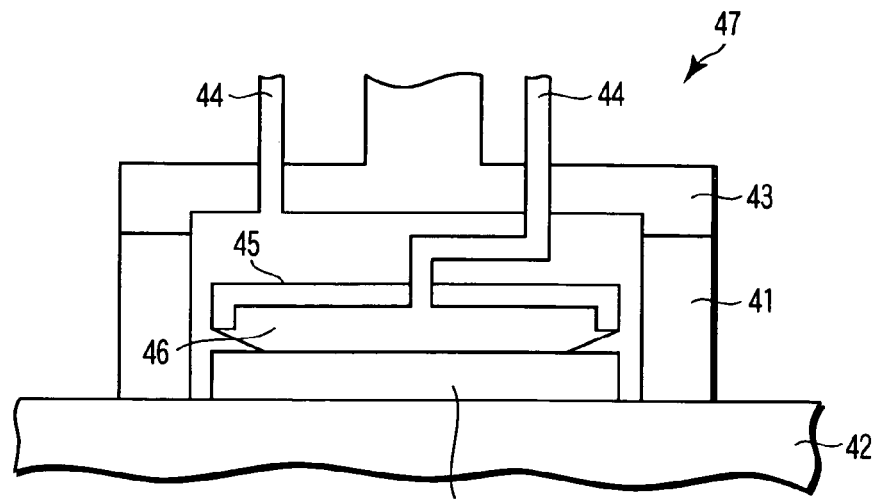
FIG. 5 is a cross-sectional view illustrating a top ring.

FIG. 5 is a cross-sectional view illustrating schematically the construction of one example of the top ring that can be employed in the embodiment of the present invention.

The top ring 47 shown in FIG. 5 comprises a box 43 having an air supply pipe 44 attached thereto, a retainer ring 41, a chucking plate 45, and an air bag 46. The polishing surface of a semiconductor substrate 40 which is held by the top ring 47 constructed in this manner is made substantially flush with the end face of the retainer ring 41. The semiconductor substrate 40 may be sustained in such a manner that the polishing surface is positioned about 0.2 mm higher than the end face of the retainer ring 41.

Accordingly, the retainer ring 41 is pressed against the polishing pad 42 by almost the same magnitude of pressure as the semiconductor substrate 40 is. Depending on some circumstances, the retainer ring 41 is pressed against the polishing pad 42 by a higher pressure than the pressure the semiconductor substrate 40 is pressed. The slurry (not shown) that has been fed to the polishing pad 42 is at first introduced into the polishing pad 42 by the retainer ring 41, thereby generating friction causing a rise in temperature of up to about 90° C. in maximum. As a result, the polymerizable component polymerizes, thereby fixing the inorganic particle to the polishing pad 42. Thereafter, the slurry is fed to the polishing surface of the semiconductor substrate 40, so that the polishing is carried out under the conditions where the generation of free particles is minimized.

Figure 6:
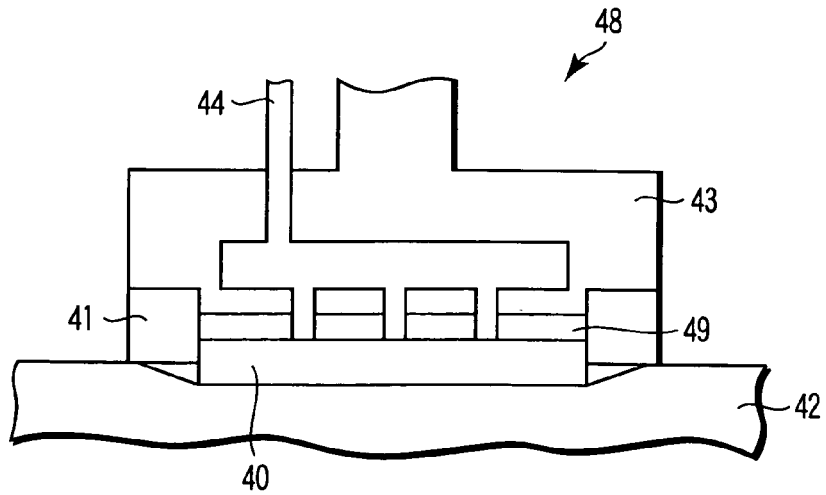
FIG. 6 is a cross-sectional view illustrating a top ring.

Whereas when a top ring 48 as shown in FIG. 6 is employed, it is impossible to fix the inorganic particle to the polishing pad 42 prior to the polishing of the polishing surface. Namely, since the polishing surface of the semiconductor substrate 40 that has been held through a backing film 49 by the top ring 48 is protruded higher than the end face of the retainer ring 41, the slurry (not shown) that has been fed onto the polishing pad 42 is directly fed to the polishing surface of the semiconductor substrate 40. In this case, the portion that becomes maximum in temperature is the polishing surface of the semiconductor substrate 40, so that the inorganic particle is fixed to the polishing pad 42 by the semiconductor substrate 40. Therefore, the fixing of the inorganic particle can be effected concurrent with the polishing.

Since the slurry according to this embodiment of the present invention contains not only the resin particle and the inorganic particle but also a polymerizable component and a polymerization initiator, it is possible to minimize the generation of free particles even if the fixing of the inorganic particle is effected concurrent with the polishing. However, in order to further enhance the fixing effect of the particles, it is especially preferable to employ the slurry in combination with a top ring having the structure shown in FIG. 5.

Embodiment 2

Several samples were prepared according to the same procedures as employed in the preparation of Sample 1 except that the molecular weight of methyl polymethacrylate employed as a polymerizable component was altered as follows. Namely, the molecular weight of methyl polymethacrylate was altered variously to 200, 300, 500, 800 and 1000, and by using methyl methacrylate monomer, six kinds of samples were prepared. The concentration of the polymerizable component of these samples was all fixed to 2 wt %.

As for the materials for the polishing pad, PMMA, urethane and polypropylene were employed to form various polishing pads, which were then employed for the polishing of an AlCu 0.5 at % film under the same conditions as employed in Embodiment 1. As a result, it was found possible to suppress the generation of erosion irrespective of the material of the polishing pad as well as irrespective of the molecular weight of the polymerizable component. Specifically, it was possible to suppress the magnitude of erosion to 20 nm or so in every combination thereof.

However, when the molecular weight of the polymerizable component became larger than 500, the polishing rate would be degraded. When the polymerizable component having a molecular weight of 1000 was incorporated in the slurry, the resultant slurry indicated an increase in viscosity, thereby degrading the fluidity of the slurry. It was confirmed from these facts that the molecular weight of the polymerizable component should preferably be limited to 500 or less.

Embodiment 3

First of all, 95 parts of styrene, 5 part of 4-vinyl pyridine, 2 parts of azo-based polymerization initiator ("V50" (trade name), Wako Junyaku Co., Ltd.) and 400 parts of ion-exchange water were placed in a 2 L flask. The resultant mixture is allowed to polymerize for 14 hours with stirring in a nitrogen gas atmosphere and at a temperature of 75° C. As a result, it was possible to obtain a cationic PST particle having an average particle diameter of 120 nm and amino group on the surface thereof. Incidentally, the yield of the polymer was 94%.

Then, colloidal silica particle (15 nm in primary particle diameter) as an inorganic particle was allowed to adsorb onto the surface of this polystyrene particle to prepare a composite type particle. On the occasion of preparing the composite type particle, the polystyrene particle was dispersed together with the silica particle in water and the resultant dispersion was subjected to a shearing process using marine propeller stirrer, thereby causing the silica particle to adsorb onto the surface of the polystyrene particle. Then, the resultant dispersion was diluted to 10-fold and coated over a sample table and dried. When this dried layer was observed by SEM, the average particle diameter of this composite type particle was 150 nm and the surface of the polystyrene particle was covered and adsorbed by substantially the monolayer of colloidal silica particle, thus constituting the composite type particle.

A sample was prepared according to the same procedures as used in the preparation of Sample 1 except that the composite type particle prepared as described above was employed.

By using this sample, the polishing of the AlCu 0.5 at % film was performed under the same conditions as described in Embodiment 1. As a result, the magnitude of erosion was suppressed to 20 nm or so, and the polishing rate of the AlCu 0.5 at % film was as excellent as 80 nm/min.

Embodiment 4

The following components were incorporated in pure water employed as a solvent to prepare the slurry of this embodiment.

| | |
|---|---|
| Resin particle: Polystyrene particle having carboxyl group on the surface thereof and a primary particle diameter of 100 nm | 2 wt % |
| Inorganic particle: Fumed alumina particle having a primary particle diameter of 20 nm | 3 wt % |
| Polymerizable component: Styrene | 5 wt % |
| Polymerization initiator: Potassium persulfate | 2 wt % |

-continued

| | |
|---|---|
| Oxidation inhibitor: Benzoyl triazole (BTA) | 0.05 wt % |
| Surfactant: Acetylene diol-based nonionic surfactant | 0.2 wt % |

Further, KOH was added to the slurry to adjust the pH thereof to 8. Due to the existence of carboxyl group on the surface of polystyrene particle, the alumina particle was adsorbed onto the surface of the polystyrene particle, thereby allowing a group of the resin particle to integrate with a group of inorganic particle. Incidentally, potassium persulfate employed herein as a polymerization initiator also acted as an oxidizing agent.

On the other hand, a slurry of comparative example 2 was also prepared by following the same procedures as described above except that the polymerization initiator was not incorporated in the slurry. By using these slurries thus obtained, Cu-CMP was performed and the polishing rate of Cu was investigated.

Each of the films was formed in the same manner as explained with reference to FIGS. 3A and 3B except that a Ta film (10 nm in film thickness) was deposited as a barrier metal film 23 and a Cu film (200 nm in film thickness) was deposited as a wiring material film 24. Then, redundant portions of the Ta film and Cu film were removed by CMP under the following conditions to expose the insulating film 21 as shown in FIG. 3B.

Polishing pad: Made of polypropylene
Polishing load: 400 gf/cm$^2$.
Flow rate of slurry: 300 cc/min.

Rotational speeds of the top ring and turntable were set to 120 rpm and 100 rpm, respectively, and the polishing was performed for three minutes. As a result, it was found that when the slurries according to this embodiment were employed, the polishing rates of the Cu film and the Ta film were 150 nm/min and 25 nm/min, respectively. Whereas, when the slurry of the comparative example 2 was employed, almost the same polishing rates of the Cu film and the Ta film as those described above were achieved.

However, when the slurry of the comparative example 2 was employed, the magnitude of erosion was as large as 100 nm, and the number of scratches was 22/cm$^2$. Whereas, when the slurries according to this embodiments were employed, the erosion was suppressed to as little as 20 nm or less and the number of scratches was limited to 2/cm$^2$, thus indicating a remarkable decrease as compared with the comparative example 2.

As explained above, according to one aspect of the present invention, it is possible to provide a slurry which is capable of minimizing the erosion and also capable of polishing the polishing surface at a practically acceptable polishing rate. According to another aspect of the present invention, it is possible to provide a polishing method which is capable of minimizing the erosion and also capable of polishing the polishing surface at a practically acceptable polishing rate. According to a further aspect of the present invention, it is possible to provide a method of manufacturing a semiconductor device which is excellent in reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A CMP slurry comprising:
   a resin particle;
   an inorganic particle;
   a polymerizable component incorporated at a concentration of 2 to 5% by weight; and
   a polymerization initiator.

2. The CMP slurry according to claim 1, wherein the polymerizable component comprises an organic component that is the same as an organic component from which the resin particle is derived.

3. The CMP slurry according to claim 1, wherein the inorganic particle is adsorbed onto a surface of the resin particle to constitute a composite type particle.

4. The CMP slurry according to claim 1, wherein the resin particle is formed of a polymer selected from the group consisting of polymethyl methacrylate and polystyrene.

5. The CMP slurry according to 1, wherein the polymerizable component is a monomer.

6. A polishing method comprising:
   contacting a polishing surface of a semiconductor substrate with a polishing pad comprising a resin as a main component and attached to a turntable; and
   dropping a CMP slurry onto the polishing pad to polish the polishing surface, the CMP slurry comprising a resin particle, an inorganic particle, a polymerizable component incorporated at a concentration of 2 to 20% by weight and a polymerization initiator.

7. The polishing method according to claim 6, wherein the polymerizable component in the CMP slurry polymerizes during polishing to fix the inorganic particle to the polishing pad.

8. The polishing method according to claim 6, wherein the polymerizable component in the CMP slurry comprises an organic component that is the same as an organic component from which the resin particle is derived.

9. The polishing method according to claim 8, wherein the resin as a main component of the polishing pad is is derived from an organic component that is the same as an organic component from which the resin particle is derived.

10. The polishing method according to claim 6, wherein the inorganic particle in the CMP slurry is adsorbed onto a surface of the resin particle to constitute a composite type particle.

11. The polishing method according to claim 6, wherein the polymerizable component in the CMP slurry is a monomer.

12. The polishing method according to claim 6, wherein the polymerizable component is included in the CMP slurry at a concentration of 2 to 5% by weight.

13. The polishing method according to claim 6, wherein the semiconductor substrate is held by a retainer ring, and the polishing surface is positioned flush with or higher than an end face of the retainer ring.

14. A method of manufacturing a semiconductor device comprising:
   forming an insulating film above a semiconductor substrate;
   forming a recessed portion in the insulating film;
   depositing a conductive material inside the recessed portion as well as on the insulating film to form a conductive layer; and
   removing the conductive material which is deposited on the insulating film by CMP using a polishing pad and a CMP slurry to expose a surface of the insulating film while selectively leaving the conductive material in the recessed portion, the polishing pad comprising a resin as a main component, the CMP slurry comprising a resin particle, an inorganic particle, a polymerizable component incorporated at a concentration of 2 to 20% by weight, and a polymerization initiator.

15. The method according to 14, wherein the polymerizable component in the CMP slurry comprises an organic component that is the same as an organic component from which the resin particle is derived.

16. The method according to 14, wherein the inorganic particle in the CMP slurry is adsorbed onto a surface of the resin particle to constitute a composite type particle.

17. The method according to 14, wherein the polymerizable component in the CMP slurry is a monomer.

18. The method according to 14, wherein the polymerizable component is included in the CMP slurry at a concentration of 2 to 5% by weight.

19. The method according to 14, wherein the conductive layer includes a Cu film which is deposited through a Ta film.

20. The CMP slurry according to claim 5, wherein the monomer is methyl methacrylate.

21. The polishing method according to 11, wherein the monomer in the CMIP slurry is methyl methacrylate.

22. The method according to 17, wherein the monomer in the CMP slurry is methyl methacrylate.

23. The polishing method according to claim 6, wherein the polymerizable component comprises an organic component that is the same as an organic component from which the resin as said main component of said polishing pad is derived.

24. The method according to 14, wherein the polymerizable component comprises an organic component that is the same as an organic component from which the resin as said main component of said polishing pad is derived.

* * * * *